(12) United States Patent
Moghaddam et al.

(10) Patent No.: US 10,808,970 B2
(45) Date of Patent: Oct. 20, 2020

(54) IONIC LIQUID-BASED ABSORPTION COOLING SYSTEM WITH HIGH COEFFICIENT OF PERFORMANCE

(71) Applicants: University of Florida Research Foundation, Incorporated, Gainesville, FL (US); University of Notre Dame, South Bend, IN (US)

(72) Inventors: Saeed Moghaddam, Gainesville, FL (US); Abhilash Paneri, Tigard, OR (US); Edward Maginn, South Bend, IN (US)

(73) Assignees: University of Florida Research Foundation, Incorporated, Gainesville, FL (US); University of Notre Dame, South Bend, IN (US)

(*) Notice: Subject to any disclaimer, the term of this patent is extended or adjusted under 35 U.S.C. 154(b) by 0 days.

(21) Appl. No.: 15/762,420

(22) PCT Filed: Sep. 27, 2016

(86) PCT No.: PCT/US2016/053881
§ 371 (c)(1),
(2) Date: Mar. 22, 2018

(87) PCT Pub. No.: WO2017/058747
PCT Pub. Date: Apr. 6, 2017

(65) Prior Publication Data
US 2018/0259229 A1    Sep. 13, 2018

Related U.S. Application Data

(60) Provisional application No. 62/233,536, filed on Sep. 28, 2015.

(51) Int. Cl.
*F25B 15/02* (2006.01)
*C09K 5/04* (2006.01)
*F25B 15/06* (2006.01)

(52) U.S. Cl.
CPC ............. *F25B 15/02* (2013.01); *C09K 5/047* (2013.01); *F25B 15/06* (2013.01); *Y02A 30/277* (2018.01); *Y02B 30/62* (2013.01); *Y02P 20/124* (2015.11)

(58) Field of Classification Search
CPC .......... F25B 15/02; F25B 15/06; C09K 5/047; Y02A 30/277; Y02B 30/62; Y02P 20/124
USPC ........................................................ 252/67
See application file for complete search history.

(56) References Cited

U.S. PATENT DOCUMENTS

| | | | |
|---|---|---|---|
| 4,138,855 A | 2/1979 | Jahan et al. | |
| 4,283,918 A | 8/1981 | Mehta | |
| 5,846,450 A | 12/1998 | Atkinson | |
| 7,687,513 B1 * | 3/2010 | Muldoon | A61K 31/435 514/277 |
| 8,069,687 B2 | 12/2011 | Jork et al. | |
| 8,568,608 B2 * | 10/2013 | Shiflett | C09K 5/041 252/364 |
| 2002/0189444 A1 * | 12/2002 | Brennecke | B01D 53/1493 95/45 |
| 2007/0144186 A1 * | 6/2007 | Shiflett | C09K 5/047 62/112 |
| 2010/0095703 A1 | 4/2010 | Jork et al. | |
| 2010/0132384 A1 | 6/2010 | Shiflett et al. | |
| 2010/0326126 A1 | 12/2010 | Seiler et al. | |
| 2012/0011886 A1 | 1/2012 | Shiflett et al. | |
| 2015/0292098 A1 * | 10/2015 | Benaben | C25D 3/10 205/262 |

FOREIGN PATENT DOCUMENTS

WO  WO 2007/070607 A2   6/2007
WO  WO-2014082420 A1 *  6/2014
WO  WO 2015/103199 A1   7/2015

OTHER PUBLICATIONS

"Lithium bis(trifluoromethylsulfonyl)imide", Matrix Scientific, VWR International, LLC, 2020. (Year: 2020).*
Dittmar, Harro R., et al., "Lower Critical Solution Temperature in the Metastable Region of an Ionic Solution in a Non-Polar Solvent", J. Phys. Chem. B, 2009, 113 (5), pp. 1249-1252, American Chemical Society.
Fukumoto, Kenta, et al., "LCST-Type Phase Changes of a Mixture of Water and Ionic Liquids Derived from Amino Acids", Angew. Chem., 2007, 119, pp. 1884-1887, Wiley-VCH Verlag GmbH & Co. KGaA.
Kohno, Yuki, et al., "Material design of ionic liquids to show temperature-sensitive LCST-type phase transition after mixing with water", Australian Journal of Chemistry, 2011, 64(12), pp. 1560-1567, CSIRO Publishing.
Lachwa, Joanna, et al., "Evidence for Lower Critical Solution Behavior in Ionic Liquid Solutions", J. Am. Chem. Soc., 2005, 127 (18), pp. 6542-6543, American Chemical Society.
Costa, Anabela, J.L., et al., "Unusual LCST-Type Behaviour Found in Binary Mixtures of Choline-Based Ionic Liquids with Ethers", RSC Advances, 2013, 3, pp. 10262-10271, The Royal Society of Chemistry, RSC Publishing.
International Searching Authority, International Search Report for Application No. PCT/US2016/053881, dated Dec. 8, 2016, 3 pages, Korean Intellectual Property Office, Republic of Korea.

* cited by examiner

*Primary Examiner* — Douglas J McGinty
(74) *Attorney, Agent, or Firm* — Alston & Bird LLP

(57) ABSTRACT

An absorption refrigeration system (ARS), includes a sorbent-refrigerant pair that has an ionic liquid (IL) sorbent and a refrigerant that displays a lower critical lower critical solution temperature (LCST) at a temperature of 50 to 100° C., wherein the separation of the sorbent from the refrigerant occurs upon heating the sorbent-refrigerant pair to a temperature above the LCST. This liquid-liquid phase separation requires significantly less energy to desorb the refrigerant from the sorbent than vapor-liquid phase separation in traditional ABSs.

19 Claims, 5 Drawing Sheets

IONIC LIQUID-BASED ABSORPTION COOLING SYSTEM WITH HIGH COEFFICIENT OF PERFORMANCE

CROSS-REFERENCE TO RELATED APPLICATIONS

This application is the U.S. national stage application of International patent application No. PCT/US2016/053881, filed Sep. 27, 2016, which claims the benefit of U.S. Provisional Application Ser. No. 62/233,536, filed Sep. 28, 2015, the disclosures of which are hereby incorporated by reference in their entireties, including all figures, tables and drawings.

BACKGROUND OF INVENTION

Absorption refrigeration systems (ARSs) have the potential to play a significant role in our future energy economy if high performance, compact, and robust systems are developed. Compact ARSs are possible; however, the fundamental thermodynamics of the cycle and hence the coefficient of performance (COP) of absorption systems have not significantly improved since their introduction in the 18th century. The performance is primarily limited because of energy required for desorbing refrigerant from the working fluids. State of the art systems employ, for example, a LiBr-water working fluid that is concentrated in the desorber by evaporating the refrigerant, and the heat energy is provided to promote the phase change from liquid water in solution to gaseous water vapor. The state of the art ARSs can include one or more additional salts with the LiBr to suppress crystallization of LiBr after desorption, or use an alternate salt that does not readily crystallize in the system, for example, as disclosed in Atkins, U.S. Pat. No. 5,846,450.

Recently, the use of ionic liquids in ARSs has been disclosed, where the ionic liquid is used as a crystallization suppressing additive to the sorbent, as disclosed in Shiflett et al. US Patent Application Publication No. 2012/0011886. In general, the ionic liquids employed as the sorbent and the refrigerant and sorbent are employed in the traditional manner, where heating separates the refrigerant as a gas from the sorbent. As taught in Shiflett et al. US Patent Application Publication No. 2010/0132384, systems are constructed to maintain a single liquid phase and not promote the formation of separated liquid phases by maintaining a working temperature that remain above any upper critical solution temperature.

Jork et al. U.S. Pat. No. 8,069,687 teaches an ARS including a separator wherein a liquid-liquid phase separation of the working medium is performed. The one liquid phase has the sorbent at a concentration of at least 20% by weight and a second liquid phase having a refrigerant concentration of at least 20% by weight. The working medium is one phase residing in a liquid-liquid miscibility gap which upon heating or cooling is at a temperature that is outside of an upper or lower critical solution temperature. By changing the desorption process to have refrigerant undergo a liquid-liquid separating from the sorbent at a moderate temperature, a significant reduction of the system's energy input can permit significant increases in the efficiency of a compact ARS. The sorbent is an ionic liquid having alkyl and aryl tosylates, fluoroalkyl tosylates, nitrate, sulfate, hydrogensulfate, alkyl and aryl sulfates, polyether sulfates and polyethersulfonates, fluoroalkyl sulfates, alkyl and arylsulfonates, fluorinated alkyl and arylsulfonates, alkyl and aryl carboxylates, fluoroalkyl carboxylates, cyanate, polyether phosphates and dicyanamide anion. The refrigerant is taught to be water, ammonia, methylamine, dimethylamine, halogenated hydrocarbons, 2,2,2-trifluroethanol, or methanol. However, there is not a single sorbent-refrigerant pair identified that necessarily permits the use of the liquid-liquid separator even though the temperature range recited for the separation is anywhere from −50 to 250° C., where this phase separation is taught to occur at either a lower critical solution temperature (LCST) or a upper critical solution temperature (UCST).

Other objects, features, and advantages of the invention will be apparent to those skilled in the art from the detailed description of the invention which will now follow, taken in conjunction with the tables, drawings, and the accompanying claims.

DETAILED DISCLOSURE

Figure 1:
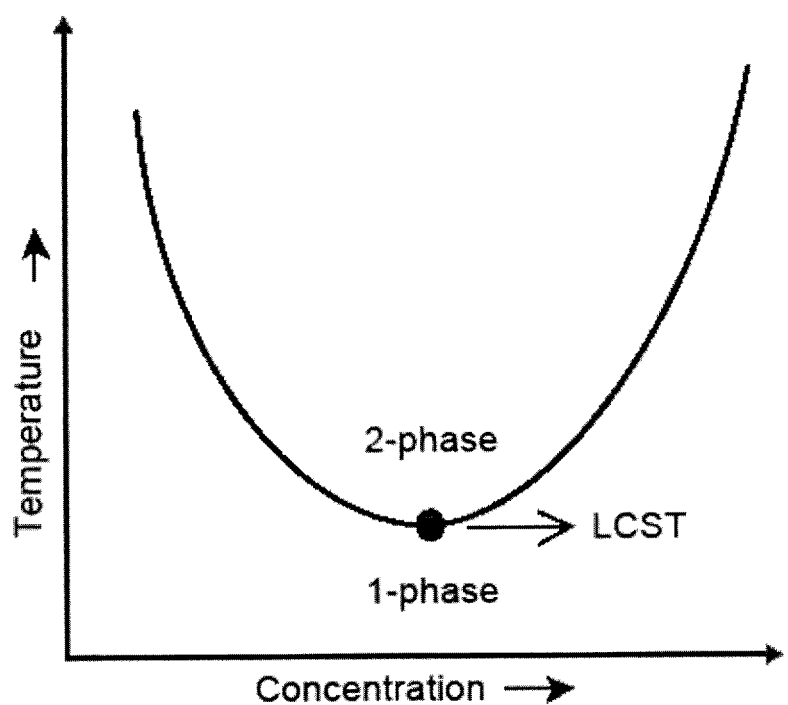
FIG. 1 shows a generalized T-x diagram for a sorbent-refrigerant pair that displays a lower critical solution temperature (LCST) that can be used in an absorption refrigeration system (ARS), according to an embodiment of the invention.
Figure 2:
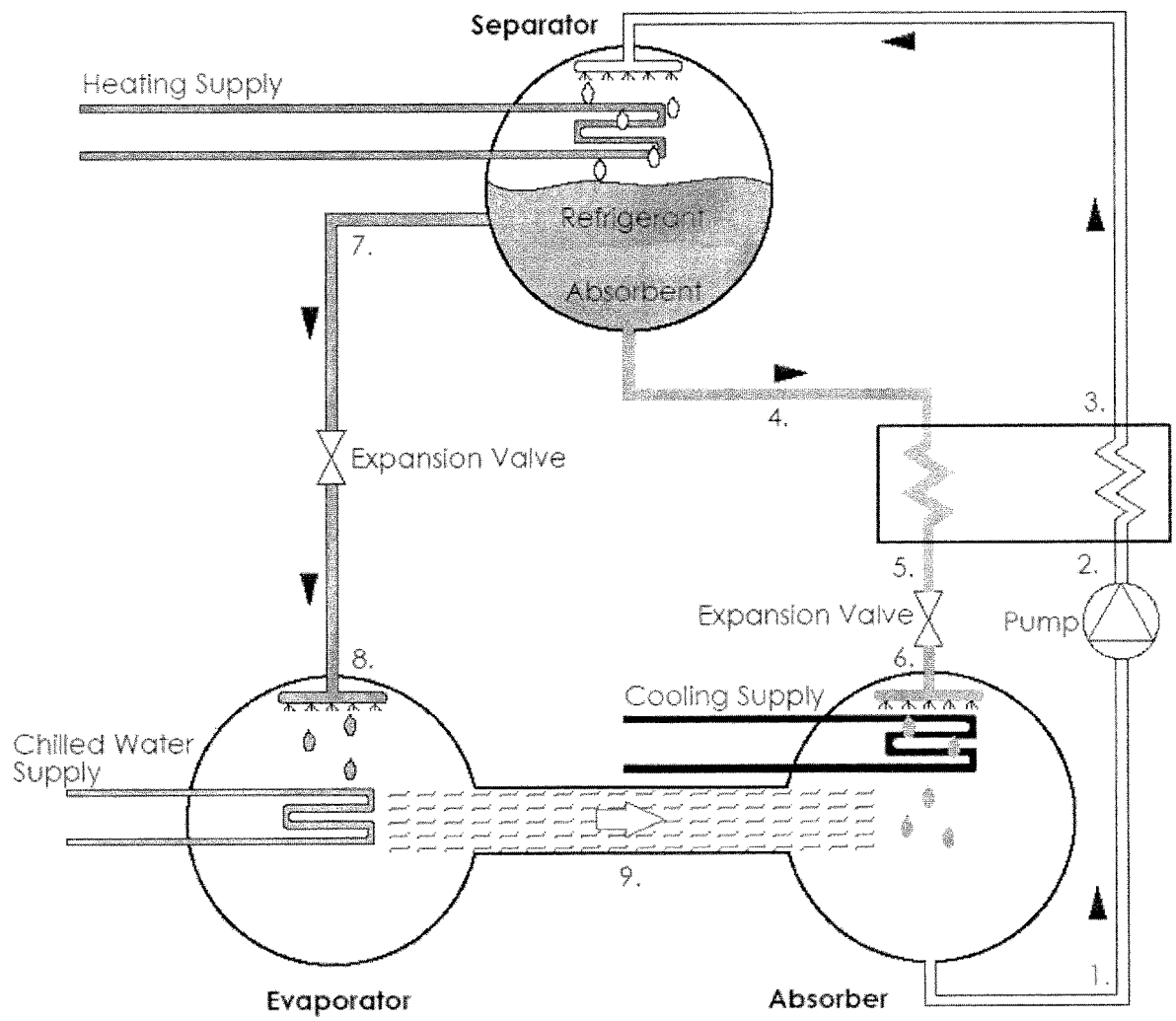
FIG. 2 is a schematic drawing of an ARS employing a separator, according to an embodiment of the invention.

Embodiments of the invention are directed to an absorption refrigeration system (ARS) and absorption refrigeration process where the sorbent, or absorbent) is an ionic liquid (IL) that phase separates from a refrigerant, or absorbate, in a liquid-liquid separator at a lower critical solution temperature (LCST) is employed rather than a desorber, which improves the coefficient of performance (COP). As no phase change is involved in separation, the energy required for vaporizing the refrigerant to permit its subsequent absorption in the concentrated IL sorbent is drastically reduced. The LCST results in phase separation upon heating, as illustrated in FIG. 1. The LCST temperature depends upon the molecular structure of the IL and the refrigerant, and can be about 30 to about 200° C., according to an embodiment of the invention. In an embodiment of the invention, the LCST is about 50-60° C. while the absorber temperature is at least 5° C. below the LCST such that a homogeneous sorbent-refrigerant solution forms upon absorption of the refrigerant. The refrigerant, also referred to as the absorbate, is a compound or mixture of compounds that undergoes phase changes between a liquid and gaseous state upon heating and cooling. The sorbent, also referred to as the absorbent, is a non-volatile IL or a mixture of an IL with other non-volatile components that absorbs the absorbate in the absorber portion of an ARS, as illustrated in FIG. 2.

For an ARS, according to an embodiment of the invention, the sorbant-refrigerant pair has good miscibility at the absorber temperature and readily phase separates with minimal heating to yield two liquid phases in the separator. Cholinium cation, 2-hydroxyethyl)trimethylammonium, and cholinium-like cations allow ILs that associate with ether refrigerants to display LCST behavior for the desired temperature window for ARSs, according to an embodiment of the invention. Cholinium-like cations are hydroxyl functionalized tetraalkyl ammonium cations, which can be indicated as $[N_{x\,y\,z\,wOH}]^+$ where x, y, and z are independently $C_1$ to $C_{12}$ alkyl, and wOH is a $C_2$ to $C_{12}$ hydroxyalkyl group, for example, 2OH represents the 2-hydroxyethyl group. Salts containing these cations are usually coupled with non-nucleophilic anions, such as, but not limited to, bis(trifluoromethanesulfonyl)imide ($[Tf_2N]^-$) that display a melting point, that is less than any temperature experienced within the ARS. Other non-nucleophilic anion include, but are not limited to, $Cl^-$, $Br^-$, $I^-$, $BF_4^-$, $SbF_6^-$, $B(C_6H_5)_4^-$, $PF_6^-$, $SO_3F^-$, $CHB_{11}F_{11}^-$, $HCO_2^-$, $CH_3CO_2^-$, $HSO_4^-$: $CH_3OSO_3^-$: $C_2H_5OSO_3^-$, $AlCl_4^-$, $CO_3^{2-}$, $HCO_3^-$, $NO_2^-$: $SO_4^{2-}$, $PO_3^{2-}$, $HPO_3^{2-}$, $H_2PO_3^-$, $PO_4^{3-}$, $HPO_4^{2-}$, $H_2PO_4^-$, $HSO_3^-$, $CuCl_2^-$, $[BR^1R^2R^3R^4]^-$, and $[BOR^1OR^2OR^3OR^4]^-$, where $R^1$, $R^2$, $R^3$, and $R^4$ are alkyl or substituted alkyl. In an embodiment of the invention, the melting point of the sorbant is depressed as a mixture of different cholinium salts, having either different cations, anions, or both. In addition to cholinium-like cations, ILs, according to embodiments of the invention include, but are not limited to: hydroxyl functionalized tetraalkyl phosphonium cations which can be indicated as $[P_{x\,y\,z\,wOH}]^+$ where x, y, and z are independently $C_1$ to $C_{12}$ alkyl, and wOH is a $C_2$ to $C_{12}$ hydroxyalkyl group; dialkylimidazolium cations and trialkylimidazolium cations, where the alkyls are independently $C_1$ to $C_{12}$ alkyl; tetraalkylammonium cations, where the alkyls are independently $C_1$ to $C_{12}$ alkyl; tetraalkylphosphonium cations, where the alkyls are independently $C_1$ to $C_{12}$ alkyl; and/or N,N-dialkylpyrrolidinium cations, where the alkyls are independently $C_1$ to $C_{12}$ alkyl. For these IL cations, one or more of the alkyl groups can be substituted with one or more hydroxyl groups or the alkyl chain can be interrupted with one or more oxygen atoms. The alkyl groups can be linear, branched, plurally branched, or cyclic, wherein the cycloalkane can be substituted with an alkyl group, a hydroxyl group, or be interrupted with one or more oxygen atoms. Hydroxyl groups, for example, those of the cholinium cation, allow formation of hydrogen bonds with the oxygen of an ether or alcohol refrigerant, or water, resulting in miscibility of the sorbent-refrigerant pair. Upon heating to a temperature in excess of the LCST, the hydrogen bonding between hydroxyl groups of the cholinium-like salts and, for example, the ether is insufficient to overcome the ionic and hydrogen bonding association between cholinium-like salts. The LCST depends on the structure of the alkyl substituents of the tetraalkyl ammonium cations, the anions, and the refrigerant. Consequently, an ionic liquid can be designed to have a specific LCST with a specific refrigerant.

So that one can appreciate the efficiency improvement available by the implementation of an IL and refrigerant where the LCST is between 50 and 200° C. and allow phase separation at these temperatures, computations for a model for a hypothetical $[P_{4444}]^+[Tf-Leu]^-$-water pair that allows separation at 172° C. and generates an evaporator temperature of 5° C. have been carried out. Upon solving the equations for conservation of mass and energy in the cycle, values are generated, as tabulated in Table 1, below, suggests that a $COP_{primary}$ of 5.8 can be achieved for a 3 ton system. Such a value implies that the primary energy consumption for air-conditioning can be reduced by an order of magnitude.

TABLE 1

Input Parameters and Calculated Values for an ABS Employing an IL-Refrigerant Pair

| Parameter | Value |
| --- | --- |
| Evaporator temperature | 5° C. |
| Separator temperature | 172° C. |
| Cooling capacity | 10.6 kW |
| Separator heat input | 1.86 kW |
| Solution HX effectiveness | 0.8 |
| $COP_{primary}$ | 5.8 |

Figure 3:
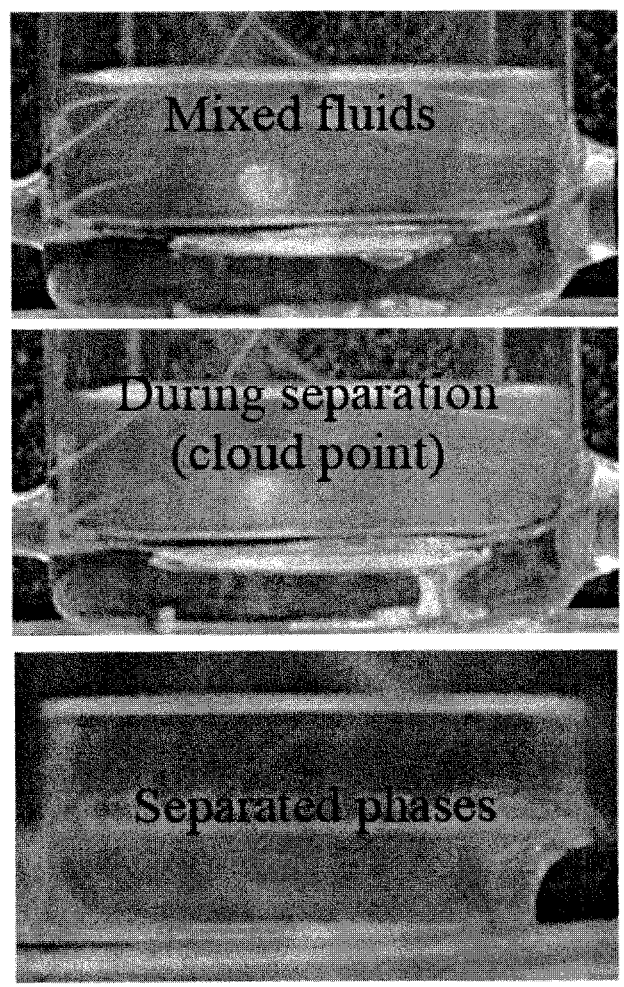
FIG. 3 shows photographs of a $[bmim]^+[BF_4]^-$ and n-butanol IL refrigerant pair that undergoes conversion from a homogeneous solution (top) through a cloud point (center) to a phase separated (bottom) n-butanol top layer and an IL bottom layer.

Particularly, where the IL-refrigerant cycle employing a separator is used with high efficiency membrane-based absorption technology, very high $COP_{primary}$ values can be achieved. Membrane-based absorbers and desorbers are disclosed in Moghaddam et al., "3D Microstructures for Rapid Absorption/Desorption in Mechanically Constrained Liquid Absorbents" PCT Application No. PCT/US2014/072664 filed Dec. 30, 2014, which is incorporated by reference, In another embodiment of the invention, the IL sorbent has a dialkylimidazolium cation and a non-nucleophilic anion with a refrigerant that is a $C_1$ to $C_6$ alcohol, for example, 1-butyl-3-methylimidazolium bis(trifluoromethylsulfonyl)imide ($[bmim]^+[Tf_2N]^-$) and the refrigerant is n-butanol, where the LCST is about 52° C. As shown in FIG. 3, the $[bmim]^+[Tf_2N]^-$ butanol pair readily converts to a homogeneous solution at temperatures below the LCST, goes through a cloud point where phase separation occurs that clearly exists as two nearly immiscible phases at temperatures in excess of the LCST. The alcohols employed as refrigerant include, but are not limited to, methanol, ethanol, n-propanol, i-propanol, cyclopropanol, n-butanol, sec-butanol, i-butanol, t-butanol, cyclobutanol, any methyl substituted propanol, any pentanol, cyclopentanol, any methyl substituted butanol, any dimethyl substituted propanol, any ethyl substituted propanol, any hexanol, cyclohexanol, any methyl substituted cyclopentanol, any dimethyl substituted cyclobutanol, any ethyl substituted cyclobutanol, any trimethyl substituted propanol, any methyl, ethyl substituted propanol, or any propyl substituted propanol. The refrigerant can be water. Refrigerants can be ethers, including, but not limited to, diethyl ether, di-n-propyl ether, di-i-propyl ether, methyl-propyl ether, ethyl-propyl ether, tetrahydrofuran, and tetrahydropyran.

The cycle consists of a separator, as shown in FIG. 2 in which the refrigerant-absorbent mixture after heating above the LCST separate into two liquid fluids. The refrigerant then flows into the evaporator, through an expansion valve, where it evaporates with the removal of heat from the ambient to create cooling. The evaporated refrigerant then flows into the absorber. A heat exchanger recovers significant portion of the absorbent's thermal energy before it enters the absorber. Upon arriving in the absorber, the absorbent absorbs the incoming refrigerant vapor from the evaporator. The latent heat of refrigerant released into the absorbent and the excess enthalpy are dissipated into the ambient. The mixture exits the absorber as a single-phase solution which is passed through a heat exchanger where, upon heating, the working pair enters the separator as two liquid phases and the cycle repeats.

Figure 4:
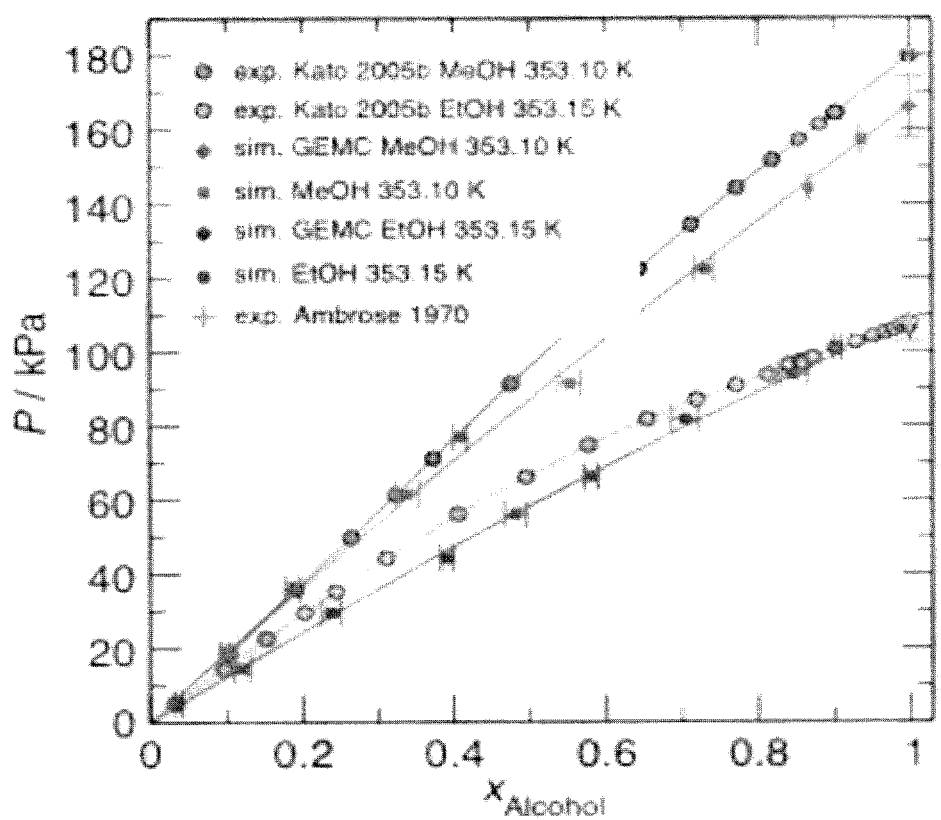
FIG. 4 shows plots of computed isotherms for $[C_2mim]^+$ $[Tf_2N]^-$ with methanol and ethanol.
Figure 5:
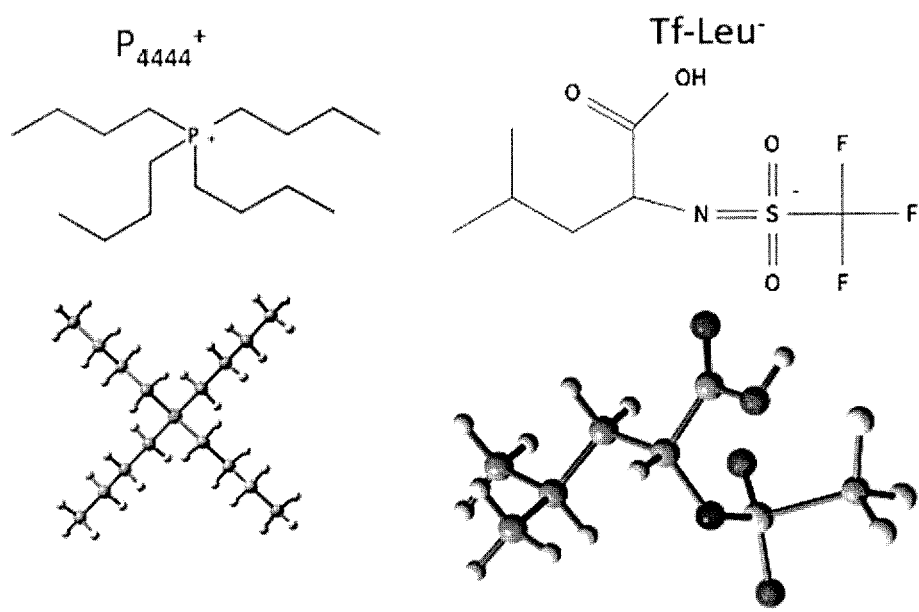
FIG. 5 shows the structure of the ionic liquid, tetra-nbutylphosphonium trifluoromethanesulfonyl leucine $([P4444]^+[Tf-Leu]^-)$ which displays a LCST with water, according to an embodiment of the invention.

To identify appropriate IL-refrigerant working pairs, known room temperature ILs are modeled using a molecular Gibbs ensemble Monte Carlo simulation for candidate IL-refrigerant pairs in order to predict the key thermodynamic properties. These properties are correlated to the molecular structure and energetics of the system and constitute a rational design strategy for identification of working pairs. FIG. 4 shows computed isotherms for methanol and ethanol in 1-ethyl-3-methylimidazolium bis(trifluoromethylsulfonyl)amide ([emim]$^+$[Tf$_2$N]$^-$), where the simulations agree very well with experimental measurements. In addition to computing isotherms, the simulations allow us to determine the enthalpy of solution and heat capacity. Candidate ILs are disclosed in Crosthwaite et al., *J. Phys. Chem. B*, 2004, 108, 5113-9, Domanska et al., *J. Chem. Eng. Data*, 2010, 55, 773-7, Lachwa et al., *J. Am. Chem. Soc.*, 2005, 127, 6542-3, Fukumoto et al., *Angew. Chemie.*, 2007, 119, 1884-7, Dittmar et al., *J. Phys. Chem. B.*, 2009, 113, 1249-52, Kohno et al., *Aust. J. Chem.*, 2011, 64, pp. 1560-7, Costa et al., *RSC*, 2013, 10262-71, which are incorporated by reference herein.

In an embodiment of the invention, the IL-refrigerant pair is tetra-nbutylphosphonium trifluoromethanesulfonyl leucine ([P$_{4444}$]$^+$[Tf-Leu]$^-$) mixed with water. In an embodiment of the invention, the IL is N-alkyl-N,N-dimethylhydroxyethylammoniumbis(trifluoromethane) sulfonylimide mixed with ethers.

All patents, patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An absorption refrigeration system (ARS), comprising:
    a sorbent-refrigerant pair, the sorbent-refrigerant pair comprising one or more ionic liquids (ILs) comprising at least:
        an anion selected from a group consisting of bis(trifluoromethanesulfonyl)imide ([Tf$_2$N]$^-$), SbF$_6$, B(C$_6$H$_3$)$_4^-$, SO$_3$F$^-$, and CHB$_{11}$F$_{11}$, and
        a cation selected from among a group consisting of hydroxyl functionalized tetraalkyl ammonium cations, hydroxyl functionalized tetraalkyl phosphonium cations, dialkylimidazolium cations, trialkylimidazolium cations, tetraalkylammonium cations, tetraalkylphosphonium cations, N,N-dialkylpyrrolidinium cations, and combinations thereof; and
    a liquid-liquid separator, wherein the sorbent-refrigerant pair undergoes a lower critical solution temperature (LCST) at a temperature of between 30° C. and 200° C.

2. The absorption refrigeration system (ARS) according to claim 1, wherein the hydroxyl functionalized tetraalkyl ammonium cations, are [N$_{x\,y\,z\,wOH}$]$^+$ cations where x, y, and z are independently C$_1$ to C$_{12}$ alkyl, and wOH is a C$_2$ to C$_{12}$ hydroxyalkyl group with w hydroxyl groups.

3. The absorption refrigeration system (ARS) according to claim 2, wherein wOH is 2OH.

4. The absorption refrigeration system (ARS) according to claim 1, wherein the hydroxyl functionalized tetraalkyl phosphonium cations, are [P$_{x\,y\,z\,wOH}$]$^+$ cations where x, y, and z are independently C$_1$ to C$_{12}$ alkyl, and wOH is a C$_2$ to C$_{12}$ hydroxyalkyl group with w hydroxyl groups.

5. The absorption refrigeration system (ARS) according to claim 1, wherein the dialkylimidazolium cations and trialkylimiazolium cations are selected from 1-butyl-3-methylimidazolium ([bmim]$^+$), 1-ethyl-3-methylimidazolium ([emim]$^+$), 2,3-dimethyl-1-ethylimidazolium ([emmim]$^+$) and 2,3-dimethyl-1-propylimidazolium ([pmmim]$^+$).

6. The absorption refrigeration system (ARS) according to claim 1, wherein the ILs are the tetraalkylammonium cations, the tetraalkylphosphonium cations, and/or the N,N-dialkylpyrrolidinium cations, wherein the alkyls are independently C$_1$ to C$_{12}$ alkyl and wherein the alkyls can be interrupted one or more times by oxygens.

7. The absorption refrigeration system (ARS) according to claim 1, wherein the refrigerant is water, an alcohol, or an ether.

8. The absorption refrigeration system (ARS) according to claim 7, wherein the alcohol is selected from methanol, ethanol, n-propanol, i-propanol, cyclopropanol, n-butanol, sec-butanol, i-butanol, t-butanol, cyclobutanol, any methyl substituted propanol, any pentanol, cyclopentanol, any methyl substituted butanol, any dimethyl substituted propanol, any ethyl substituted propanol, any hexanol, cyclohexanol, any methyl substituted cyclopentanol, any dimethyl substituted cyclobutanol, any ethyl substituted cyclobutanol, any trimethyl substituted propanol, any methyl,ethyl substituted propanol, or any propyl substituted propanol.

9. The absorption refrigeration system (ARS) according to claim 7, wherein the ether is selected from diethyl ether, di-n-propyl ether, di-i-propyl ether, methyl-propyl ether, ethyl-propyl ether, tetrahydrofuran, and tetrahydropyran.

10. The absorption refrigeration system (ARS) according to claim 1, wherein the LCST between 50° and 100° C.

11. An absorption refrigeration system (ARS), comprising a sorbent-refrigerant pair and a liquid-liquid separator, wherein the sorbent-refrigerant pair comprises at least one ionic liquid (IL) and undergoes a lower critical solution temperature (LCST) at a temperature between 30° C. and 200° C., wherein the at least one IL comprises one or more dialkylimidazolium cations and one or more non-nucleophilic hexafluorophosphate anions.

12. The absorption refrigeration system (ARS) according to claim 11, wherein the at least one IL further comprises one of hydroxyl functionalized tetraalkyl ammonium cations, hydroxyl functionalized tetraalkyl phosphonium cations, trialkylimidazolium cations, tetraalkylammonium cations, tetraalkylphosphonium cations, N,N-dialkylpyrrolidinium cations, and combinations thereof.

13. The absorption refrigeration system (ARS) according to claim 12, wherein the hydroxyl functionalized tetraalkyl ammonium cations, are [N$_{x\,y\,z\,wOH}$]$^+$ cations where x, y, and z are independently C$_1$ to C$_{12}$ alkyl, and wOH is a C$_2$ to C$_{12}$ hydroxyalkyl group with w hydroxyl groups.

14. The absorption refrigeration system (ARS) according to claim 13, wherein wOH is 2OH.

15. The absorption refrigeration system (ARS) according to claim 12, wherein the dialkylimidazolium cations and trialkylimiazolium cations are selected from 1-butyl-3-methylimidazolium ([bmim]$^+$), 1-ethyl-3-methylimidazolium ([emim]$^+$), 2,3-dimethyl-1-ethylimidazolium ([emmim]$^+$) and 2,3-dimethyl-1-propylimidazolium ([pmmim]$^+$).

16. The absorption refrigeration system (ARS) according to claim 11, wherein the refrigerant is water or an alcohol selected from methanol, ethanol, n-propanol, i-propanol, cyclopropanol, n-butanol, sec-butanol, i-butanol, t-butanol, cyclobutanol, any methyl substituted propanol, any pentanol, cyclopentanol, any methyl substituted butanol, any dimethyl substituted propanol, any ethyl substituted propanol, any hexanol, cyclohexanol, any methyl substituted cyclopentanol, any dimethyl substituted cyclobutanol, any ethyl substituted cyclobutanol, any trimethyl substituted propanol, any methyl,ethyl substituted propanol, or any propyl substituted propanol.

17. An absorption refrigeration system (ARS), comprising a sorbent-refrigerant pair and a liquid-liquid separator, wherein the sorbent-refrigerant pair comprises at least one ionic liquid (IL) and undergoes a lower critical solution temperature (LCST) at a temperature between 30° C. and 200° C., wherein the at least one IL comprises one or more alkylimidazolium cations and one or more non-nucleophilic hexafluorophosphate anions, and wherein the refrigerant comprises an alcohol or water.

18. The absorption refrigeration system (ARS) of claim 17, wherein the alkylimidazolium cation is selected from 1-butyl-3-methylimidazolium ([bmim]$^+$), 1-ethyl-3-methylimidazolium ([emim]$^+$), 2,3-dimethyl-1-ethylimidazolium ([emmim]$^+$) and 2,3-dimethyl-1-propylimidazolium ([pmmim]$^+$).

19. The absorption refrigeration system (ARS) of claim 17, wherein the at least one IL further comprises hydroxyl functionalized tetraalkyl phosphonium cations, trialkylimidazolium cations, tetraalkylammonium cations, tetraalkylphosphonium cations, N,N-dialkylpyrrolidinium cations, and combinations thereof.

\* \* \* \* \*